(12) United States Patent
Tang et al.

(10) Patent No.: US 8,427,622 B2
(45) Date of Patent: *Apr. 23, 2013

(54) LIQUID CRYSTAL DISPLAY PANEL HAVING A TOUCH FUNCTION

(75) Inventors: Pao Yun Tang, Taoyuan County (TW); Kei Hsiung Yang, Taoyuan (TW); Po Yang Chen, Tainan (TW)

(73) Assignee: Hannstar Display Corp. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/216,315

(22) Filed: Aug. 24, 2011

(65) Prior Publication Data

US 2011/0304793 A1 Dec. 15, 2011

Related U.S. Application Data

(63) Continuation of application No. 12/391,632, filed on Feb. 24, 2009, now Pat. No. 8,027,008.

(30) Foreign Application Priority Data

Dec. 1, 2008 (TW) .............................. 97146550 A

(51) Int. Cl.
*G02F 1/1345* (2006.01)

(52) U.S. Cl.
USPC ............... 349/149; 349/56; 349/84; 349/139; 349/150; 349/151

(58) Field of Classification Search .................... 349/56, 349/84, 139, 149, 150, 151
See application file for complete search history.

(56) References Cited

U.S. PATENT DOCUMENTS

| | | | |
|---|---|---|---|
| 7,630,048 B2 * | 12/2009 | Hong et al. | 349/150 |
| 7,924,269 B2 | 4/2011 | Chen et al. | |
| 8,027,008 B2 * | 9/2011 | Tang et al. | 349/149 |
| 2006/0028154 A1 * | 2/2006 | Shimokawa et al. | 315/307 |
| 2007/0176868 A1 | 8/2007 | Lee et al. | |
| 2008/0062139 A1 | 3/2008 | Hotelling et al. | |
| 2010/0060817 A1 | 3/2010 | Park et al. | |

FOREIGN PATENT DOCUMENTS

| | | |
|---|---|---|
| TW | 200537406 | 11/2005 |
| TW | 200625155 | 7/2006 |
| TW | 200729121 | 8/2007 |

* cited by examiner

*Primary Examiner* — Jennifer Doan
(74) *Attorney, Agent, or Firm* — Lowe Hauptman Ham & Berner, LLP

(57) ABSTRACT

A liquid crystal display panel includes a lower substrate, a printed circuit board, at least one connection unit and a plurality of readout lines. The connection unit is adapted to connect the printed circuit board to a periphery region of the lower substrate, and has a driver. The readout lines are extended from the lower substrate to the printed circuit board through the connection unit having the driver.

22 Claims, 8 Drawing Sheets

LIQUID CRYSTAL DISPLAY PANEL HAVING A TOUCH FUNCTION

CROSS REFERENCE TO RELATED APPLICATION

This application is a continuation of U.S. application Ser. No. 12/391,632, filed Feb. 24, 2009, now U.S. Pat. No. 8,027,008, and claims the priority benefit of Taiwan Patent Application Serial Number 097146550, filed Dec. 1, 2008, the full disclosure of which is incorporated herein by reference.

BACKGROUND OF THE INVENTION

1. Field of the Invention

The present invention generally relates to a liquid crystal display panel, and more particularly to a liquid crystal display panel having a touch function.

2. Description of the Related Art

Referring to FIG. 1, a conventional liquid crystal display panel 10 includes a data printed circuit board (data PCB) 32, a plurality of data tape carrier package (date TCP) 34, a gate printed circuit board (gate PCB) 36, and a plurality of gate tape carrier package (gate TCP) 38. Each date TCP 34 is electrically connected to the data PCB 32 and data lines of the liquid crystal display panel 10 and includes a data driver 42. Each gate TCP 38 is electrically connected to the gate PCB 36 and gate lines of the liquid crystal display panel 10 and includes a gate driver 44.

The liquid crystal display panel 10 is formed by combining a thin film transistor (TFT) substrate 52 with a color filter (CF) substrate 54. There is a gap between the TFT substrate 52 and the CF substrate 54, wherein a liquid crystal layer is filled in the gap.

According to the driving principle of the liquid crystal display panel, the liquid crystal display panel is provided with a plurality of gate lines and data lines, wherein the gate lines are adapted to switch on or off gate electrodes of thin film transistors (TFTs), and the data lines are adapted to transmit data signals. The PCB is provided with a timing controller (T-con), DC/DC converter and control lines. Generally, the PCB is designed to transmit driving signals and control signals of data drivers and gate drivers to the data lines and gate lines of the liquid crystal display panel respectively.

Generally, after a touch panel and a liquid crystal display panel are manufactured independently, the liquid crystal display device having a touch function is formed by assembling the touch panel to the liquid crystal display panel. Conventional touch panel can be a resistance type, an electromagnetism type or a capacitance type touch panel. The resistance type touch panel detects a coordinate of a touch point by sensing resistance. In other words, the coordinate of the touch point is acquired by measuring a resistance variation resulted from the touch point at the relative regions of the touch panel. The electromagnetism type touch panel detects a position of a touch point corresponding to a surface of the touch panel by sensing electromagnetism or transmitting and receiving electromagnetism. The capacitance type touch panel detects a coordinate of a touch point by sensing capacitance. In other words, the coordinate of the touch point is acquired by measuring a capacitance variation resulted from the touch point at the relative regions of the touch panel.

In addition, a touch component and a display component are currently integrated and manufactured to the same panel so as to form a liquid crystal display panel having a touch function. Referring to FIG. 2, Taiwan Patent Application Number 09145375 discloses that a conventional optical liquid crystal display panel 10 includes a plurality of gate lines 12 laterally disposed, a plurality of data lines 14 longitudinally disposed, and a plurality of first and second pixels 16, 18. The first and second pixels 16, 18 is respectively constituted by the enclosure of two adjacent gate lines 12 and two adjacent data lines 14. The first pixel 16 includes a first TFT 20 which has a gate electrode electrically connected to the gate line 12, a source electrode electrically connected to the data line 14, and a drain electrode electrically connected to a pixel electrode (not shown). The second pixel 18 includes second and third TFTs 22, 24 which respectively has a gate electrode electrically connected to two adjacent gate lines 12. The second TFT 22 further has a source electrode electrically connected to one of two adjacent data line 14, and a drain electrode electrically connected to a pixel electrode (not shown). The third TFT 24 further has a source electrode and a drain electrode electrically connected to an optical sensor 26 and a readout line 28 respectively. Generally, the optical sensor 26 is a fourth TFT which has a gate electrode and a source electrode electrically connected to a bias line 30 having constant pressure simultaneously, and a drain electrode electrically connected to the source electrode of the third TFT 24. When the optical sensor 26 is illuminated by an external light, the optical sensor 26 can generate an optical current acted as an optical signal.

Referring to FIG. 3, after the optical signal is read by the third TFT 24, the optical signal is transmitted to a signal processor 40 through the readout line 28 and a fan-out line 46 so as to detect a coordinate of a touch point positioned at the liquid crystal display panel 10. There are fan-out lines 46 formed between the readout lines 28 and the signal processor 40 for electrically connecting the readout lines 28 to the signal processor 40.

However, the gate TCP 38 in the prior art is not designed with conductive lines corresponding to the fan-out lines 46, and thus the readout lines 28 must be electrically connected to the signal processor 40 through an additional flexible printed circuit (FPC) board 48. Therefore, the FPC board 48 can increase the manufacture time and cost. Furthermore, the fan-out lines 46 also occupy some area of the liquid crystal display panel 10 so as to reduce the area of display region of the liquid crystal display panel 10.

Accordingly, there exists a need for a liquid crystal display panel having a touch function capable of solving the above-mentioned problems.

SUMMARY OF THE INVENTION

It is an object of the present invention to provide a liquid crystal display panel having a touch function, wherein it is not necessary that readout lines pass through an additional flexible printed circuit (FPC) board, whereby the manufacture time and cost are not increased, and the weight of liquid crystal display panel can be also decreased.

In order to achieve the foregoing object, the present invention provides a liquid crystal display panel includes a lower substrate, a printed circuit board, at least one connection unit and a plurality of readout lines. The lower substrate has a periphery region. The connection unit is adapted to connect the printed circuit board to the periphery region of the lower substrate, and has a driver. The readout lines are extended from the lower substrate to the printed circuit board through the connection unit having the driver.

The connection unit (e.g. Data COF Package or the combination of a data driver and a flexible board) of the present invention is designed with conductive lines corresponding to the fan-out lines and electrically connected to the signal processor. Thus, it is not necessary that the readout lines pass through an additional flexible printed circuit (FPC) board, whereby the manufacture time and cost are not increased, and the weight of liquid crystal display panel can be decreased. Furthermore, it is not necessary that the fan-out lines are extended along a periphery region of the lower substrate, and thus the fan-out lines do not occupy some area of the liquid crystal display panel so as to reduce the whole outline dimension of the liquid crystal display panel.

The foregoing, as well as additional objects, features and advantages of the invention will be more apparent from the following detailed description, which proceeds with reference to the accompanying drawings.

DETAILED DESCRIPTION OF THE PREFERRED EMBODIMENT

Figure 4:
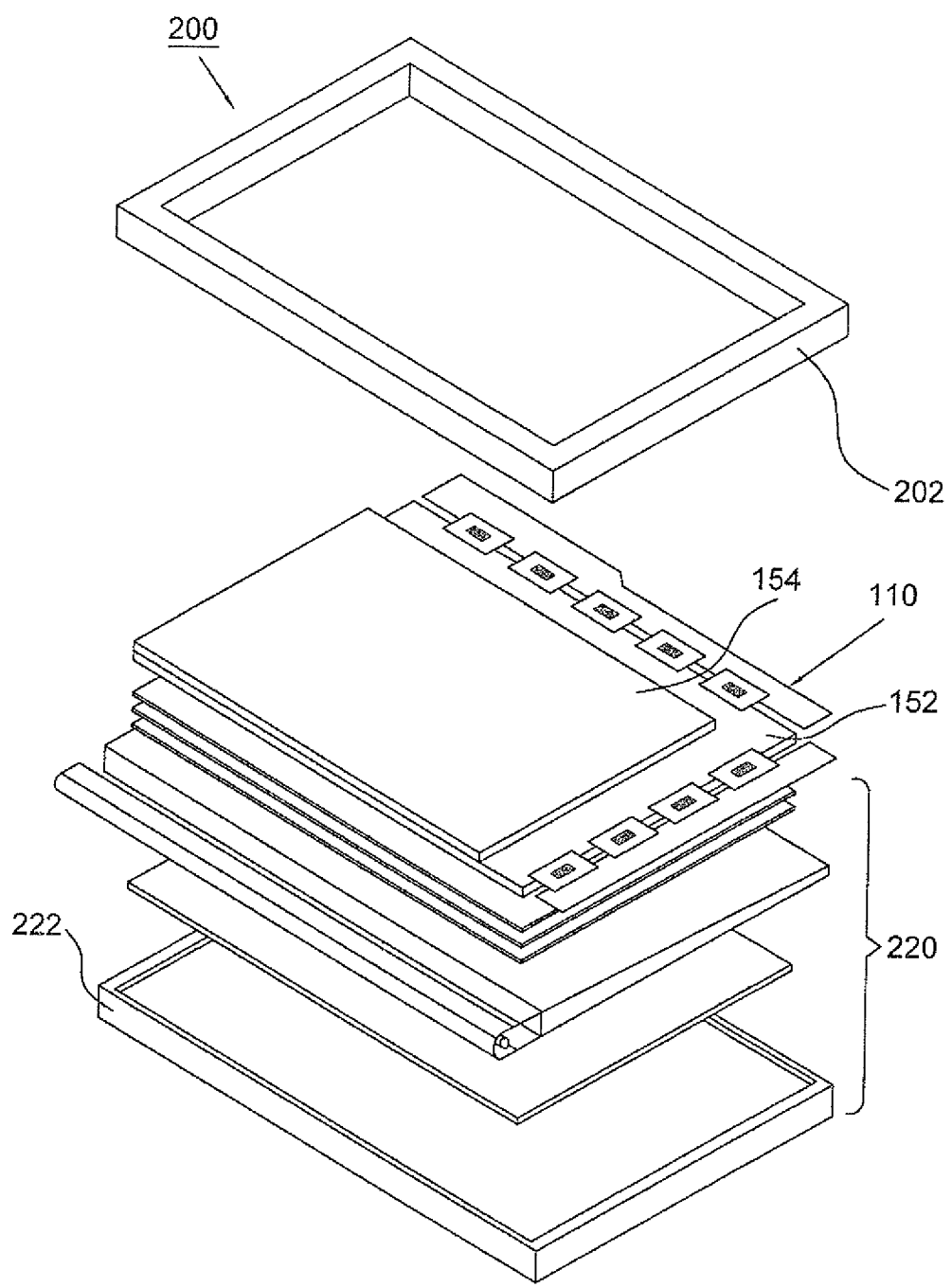
FIG. 4 is a perspective schematic view of a liquid crystal display device of the present invention.

Referring to FIG. 4, a liquid crystal display panel 110 of the present invention having a touch function can be applied to a liquid crystal display device 200. The liquid crystal display device 200 includes a top frame 202, the liquid crystal display panel 110 of the present invention and a backlight module 220. The liquid crystal display panel 110 has a liquid crystal layer (not shown) disposed between an upper substrate 152 and a lower substrate 154 (e.g. TFT substrate and CF substrate) for displaying images. The backlight module 220 is adapted to provide a light source for illuminating the liquid crystal display panel 110, and includes a bottom plate 222 is assembled with the top frame 202 each other so as to combine the top frame 202, the liquid crystal display panel 110 and the backlight module 220 to the liquid crystal display device 200.

Figure 5:
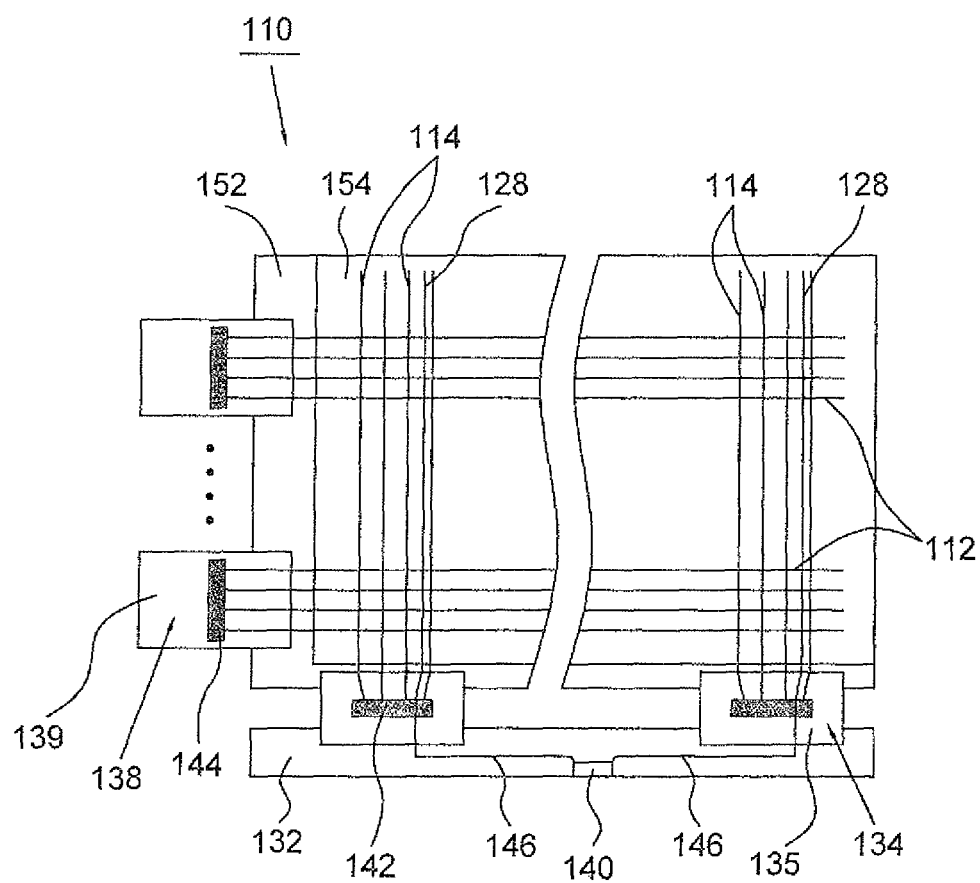
FIG. 5 is a plan schematic view of a liquid crystal display panel having a touch function according to the first embodiment of the present invention.

Referring to FIG. 5, it depicts a liquid crystal display panel 110 having a touch function according to the first embodiment of the present invention, e.g. a liquid crystal display panel having an optical touch component. The liquid crystal display panel 110 includes a data printed circuit board (data PCB) 132, a plurality of first connection units 134 (e.g. a data chip on film package, i.e. Data COF Package), and a plurality of second connection units 138 (e.g. a gate chip on film package, i.e. Gate COF Package, or a gate chip on glass package, i.e. Gate COG Package). Each first connection unit 134 is electrically connected to the data PCB 132 and a periphery region of a long side of the lower substrate 152 and includes a data driver 142. Each second connection unit 138 is electrically connected to a periphery region of a short side of the lower substrate 152 and includes a gate driver 144. The first and second connection units 134, 138 further includes flexible boards 135, 139 respectively, wherein the data driver 142 is mounted on the flexible board 135, and the gate driver 144 is mounted on the flexible board 139 or the lower substrate 152 (not shown).

The lower substrate 152 is provided with a plurality of gate lines 112 and data lines 114, wherein the gate lines 112 are adapted to switch on or off gate electrodes of thin film transistors (TFTs), and the data lines 114 are adapted to transmit digital image signals. The data PCB 132 is provided with a timing controller (T-con), DC/DC converter and control lines.

Figure 1:
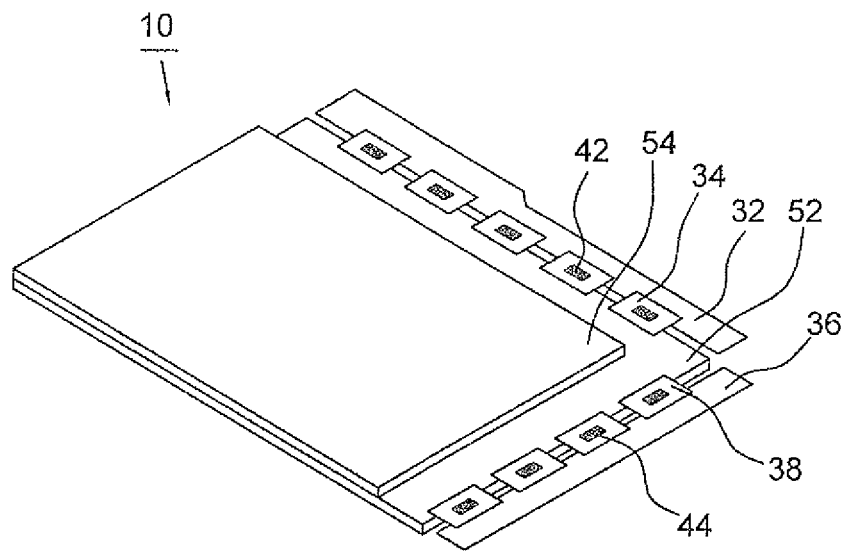
FIG. 1 is a perspective schematic view of a liquid crystal display panel in the prior art.
Figure 2:
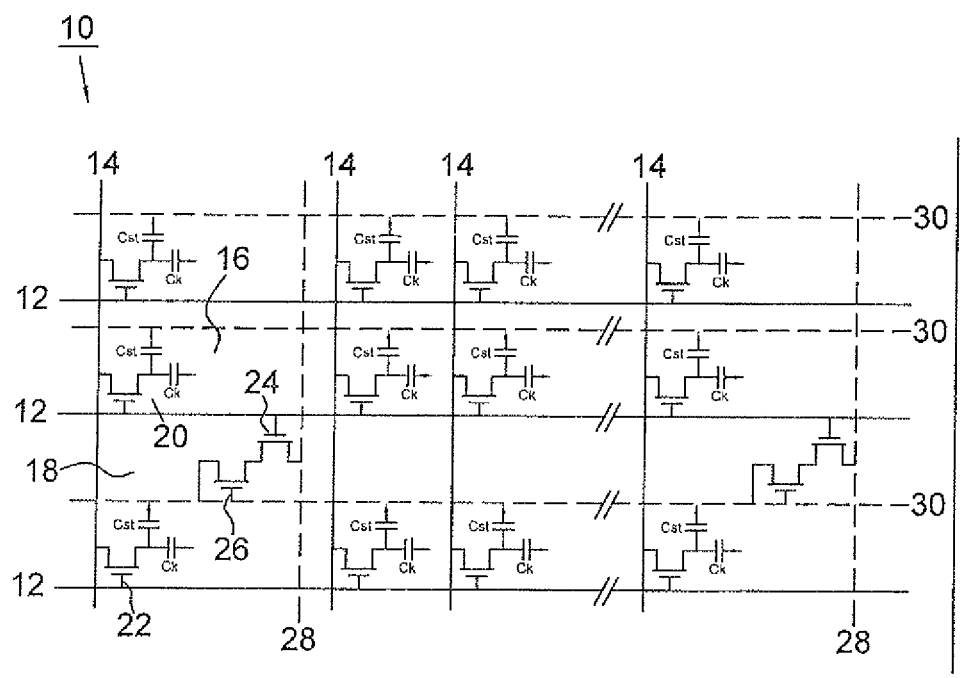
FIG. 2 is a circuit diagram of a liquid crystal display panel having a touch function in the prior art.
Figure 3:
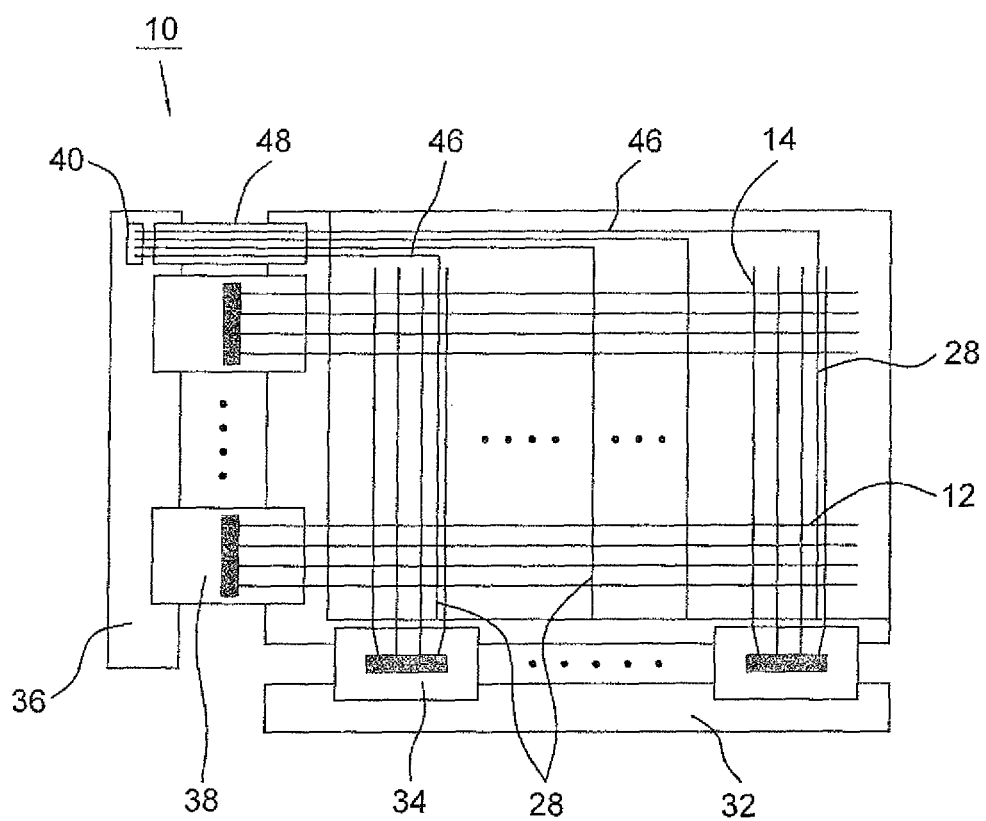
FIG. 3 is a plan schematic view of a liquid crystal display panel having a touch function in the prior art.

In this embodiment, the liquid crystal display panel 110 can includes an optical type touch panel. The optical sensor (e.g. numeral 26 shown in FIG. 2) can generate an optical current acted as an optical signal when the optical sensor is illuminated by an external light. The optical signal is transmitted to a signal processor 140 of the data PCB 132 through a plurality of readout lines 128 so as to detect a coordinate of a touch point positioned at the liquid crystal display panel 110. In other embodiment, the liquid crystal display panel 110 can includes a resistance type touch panel, which detects a coordinate of a touch point by resistance type sensors, i.e. the coordinate of the touch point is acquired by measuring a resistance variation resulted from the touch point at the relative regions of the touch panel; the liquid crystal display panel 110 can includes an electromagnetism type touch panel, which detects a position of a touch point corresponding to a surface of the touch panel by electromagnetism type sensors or by transmitting and receiving electromagnetism; and the liquid crystal display panel 110 can includes a capacitance type touch panel, which detects a coordinate of a touch point by capacitance type sensors, i.e. the coordinate of the touch point is acquired by measuring a capacitance variation resulted from the touch point at the relative regions of the touch panel. All resistance type sensors, electromagnetism type sensors and capacitance type sensors can generate sensing signals, which are transmitted to the signal processor 140 of the data PCB 132 through the readout lines 128.

The readout lines 128 are extended from the lower substrate 152 to the data PCB 132 through the first connection unit 134 (e.g. Data COF Package) having the data driver 142. The data PCB 132 can include a plurality of fan-out lines 146 for electrically connecting the readout lines 128 to the signal processor 140. The readout lines 128 are substantially parallel to the data lines 114 or perpendicular to the gate lines 112. Each readout lines 128 can be located between adjacent two of the data lines 114. For example, the liquid crystal display panel 110 with the resolution of 1440×900 uses six data drivers 142 which each has 720 channels. Eight pixels are corresponding to one readout line 128, i.e. twenty-four data lines 114 must be inserted into the interval between two adjacent readout lines 128. Thus, 30 readout lines 128 can be distributed to one data driver 142.

Figure 6:
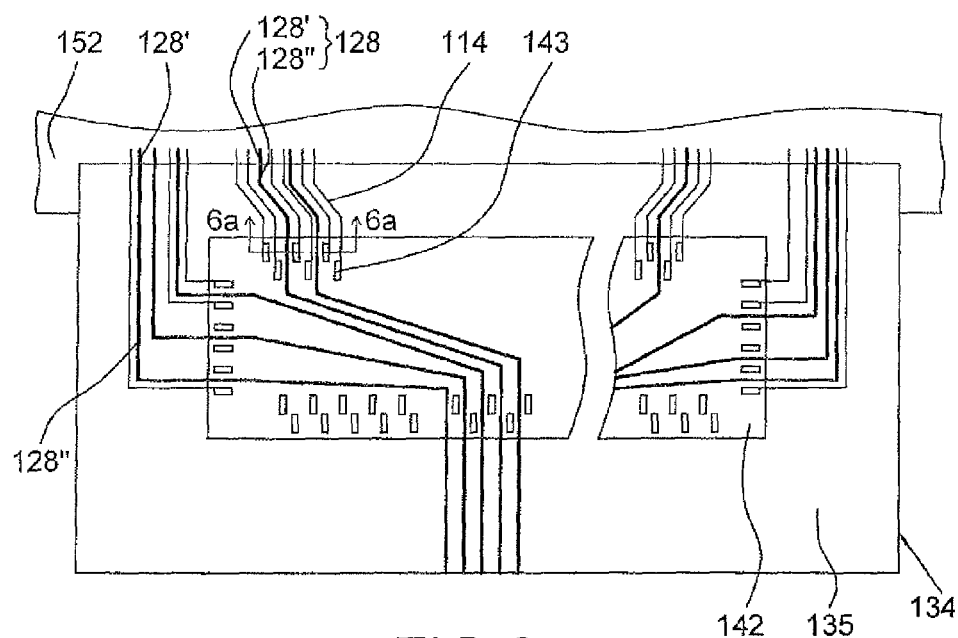
FIG. 6 is a partially expanded plan schematic view of the first connection unit according to an embodiment of the present invention, showing that the first connection unit is a Data COF Package.
Figure 6A:
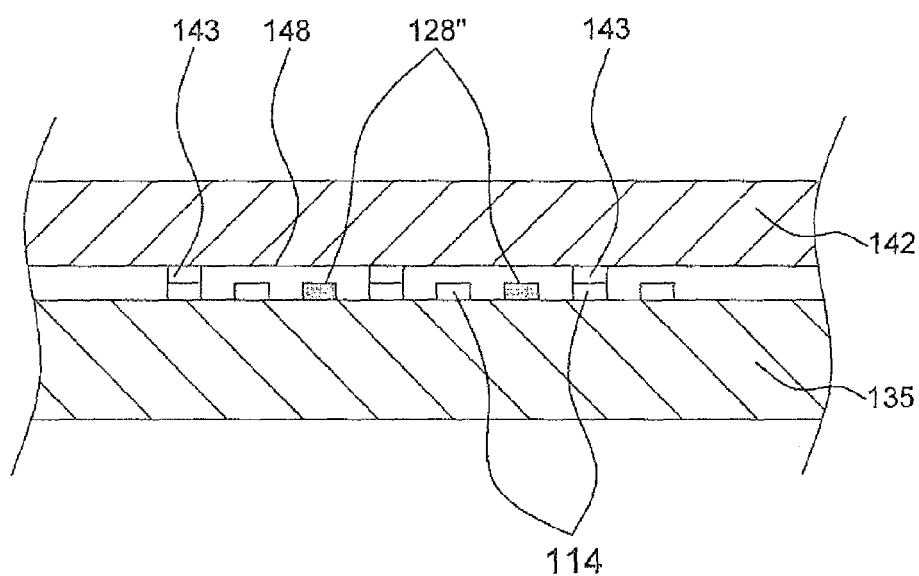
FIG. 6a is a partially expanded cross-sectional schematic view of the first connection unit taken along line 6a-6a of FIG. 6.

Referring to FIG. 6, in this embodiment the lower substrate 152 is provided with a plurality of signal lines 128', the flexible board 135 is provided with a plurality of conductive lines 128", and each signal line 128' and conductive line 128" are electrically connected to each other (e.g. by anisotropic conductive film, i.e. ACF), whereby the readout line 128 is constituted by one signal line 128' and one conductive line 128". The data driver 142 includes a plurality of bumps 143, the conductive line 128" is located between the bumps 143, and the bumps 143 are electrically connected to the data lines 114. Referring to FIG. 6a, it depicts a cross-sectional schematic view taken along line 6a-6a of FIG. 6. The conductive lines 128" of the readout lines 128 pass through a bottom 148 of the data driver 142 (the bottom 148 is provided with integrated circuit, i.e. IC), but the conductive lines 128" does not pass through shorting lines (not shown) located inside the data driver 142.

Figure 7:
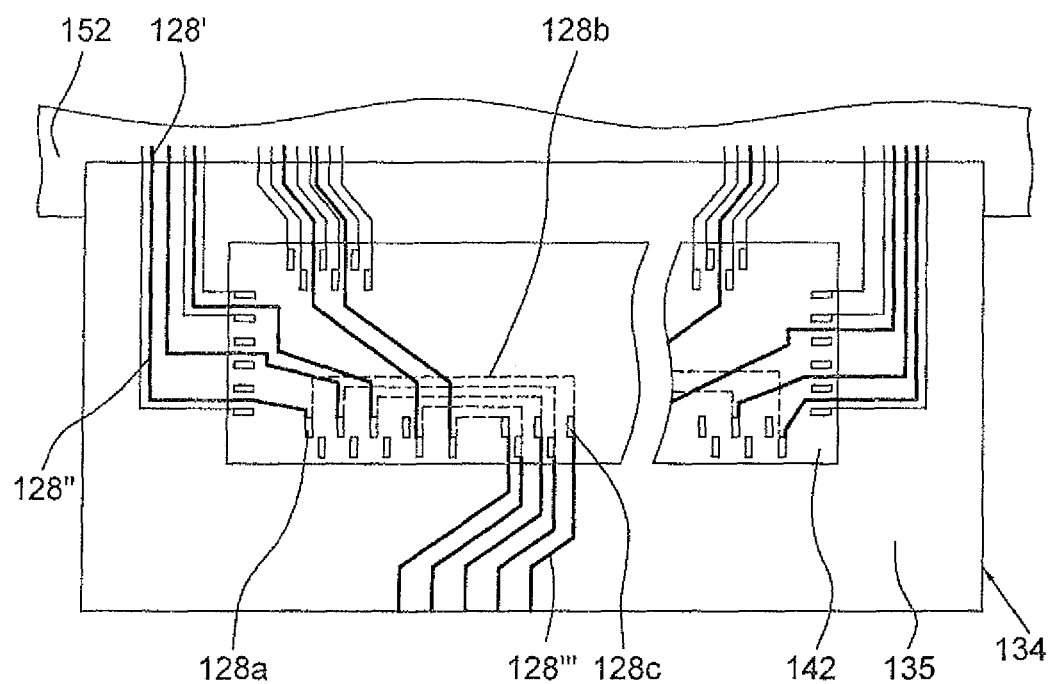
FIG. 7 is a partially expanded plan schematic view of the first connection unit according to another embodiment of the present invention, showing that the first connection unit is a Data COF Package.

Referring to FIG. 7, in another embodiment the lower substrate 152 is provided with a plurality of signal lines 128', the flexible board 135 is provided with a plurality of input and output conductive lines 128", 128''', and the data driver 142 includes a plurality of input terminals 128a, shorting lines 128b and output terminals 128c. Each signal line 128', input conductive lines 128", input terminal 128a, shorting line 128b, output terminal 128c and output conductive line 128''' are electrically connected in sequence, whereby the readout line 128 is constituted by the signal line 128', input conductive lines 128", input terminal 128a, shorting line 128b, output terminal 128c and output conductive line 128'''. As shown in FIG. 7, the readout lines 128 pass through the shorting lines 128b of the data driver 142.

The first connection unit (e.g. Data COF Package) of the present invention is designed with conductive lines corresponding to the fan-out lines and electrically connected to the signal processor. Thus it is not necessary that the readout lines pass through an additional flexible printed circuit (FPC) board, whereby the manufacture time, the manufacture cost and the weight of liquid crystal display panel can be decreased. Furthermore, it is not necessary that the fan-out lines are extended along a periphery region of the lower substrate, and thus the fan-out lines do not occupy some area of the liquid crystal display panel so as to reduce the whole outline dimension of the liquid crystal display panel.

Figure 8:
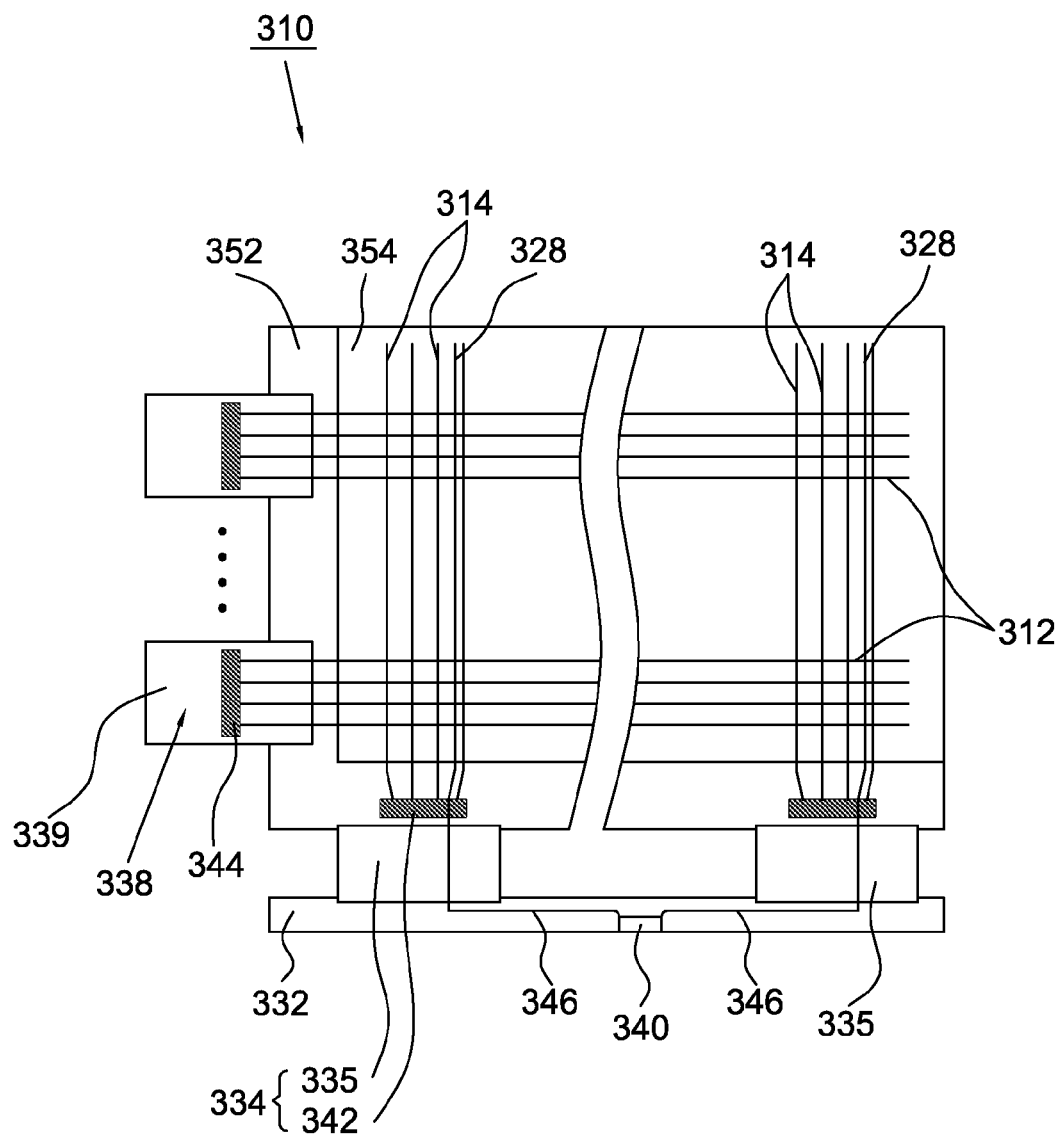
FIG. 8 is a plan schematic view of a liquid crystal display panel having a touch function according to the second embodiment of the present invention.

Referring to FIG. 8, it depicts a liquid crystal display panel 310 according to the second embodiment of the present invention. The liquid crystal display panel 310 includes a data PCB 332, a plurality of first connection units 334 (e.g. a data driver 342 and a flexible board 335 are combined to the first connection unit 334), and a plurality of second connection units 338 (e.g. a gate chip on film package, i.e. Gate COF Package, or a gate chip on glass package, i.e. Gate COG Package). Each first connection unit 334 is electrically connected to the data PCB 332 and a periphery region of a long side of the lower substrate 352 and includes the data driver 342 and flexible board 335. It is noted that the data driver 342 is mounted on the lower substrate 352 rather than the flexible board 335. Each second connection unit 338 is electrically connected to a periphery region of a short side of the lower substrate 352 and includes a gate driver 344 and flexible board 339, wherein the gate driver 344 is mounted on the flexible board 339 or the lower substrate 352 (not shown).

The lower substrate 352 is provided with a plurality of gate lines 312 and data lines 314. The readout lines 328 are extended from the lower substrate 352 to the data PCB 332 through the first connection unit 334 having the data driver 342. The data PCB 332 can include a plurality of fan-out lines 346 for electrically connecting the readout lines 328 to a signal processor 340. The readout lines 328 are substantially parallel to the data lines 314 or perpendicular to the gate lines 312. Each readout lines 328 can be located between adjacent two of the data lines 314.

Figure 9:
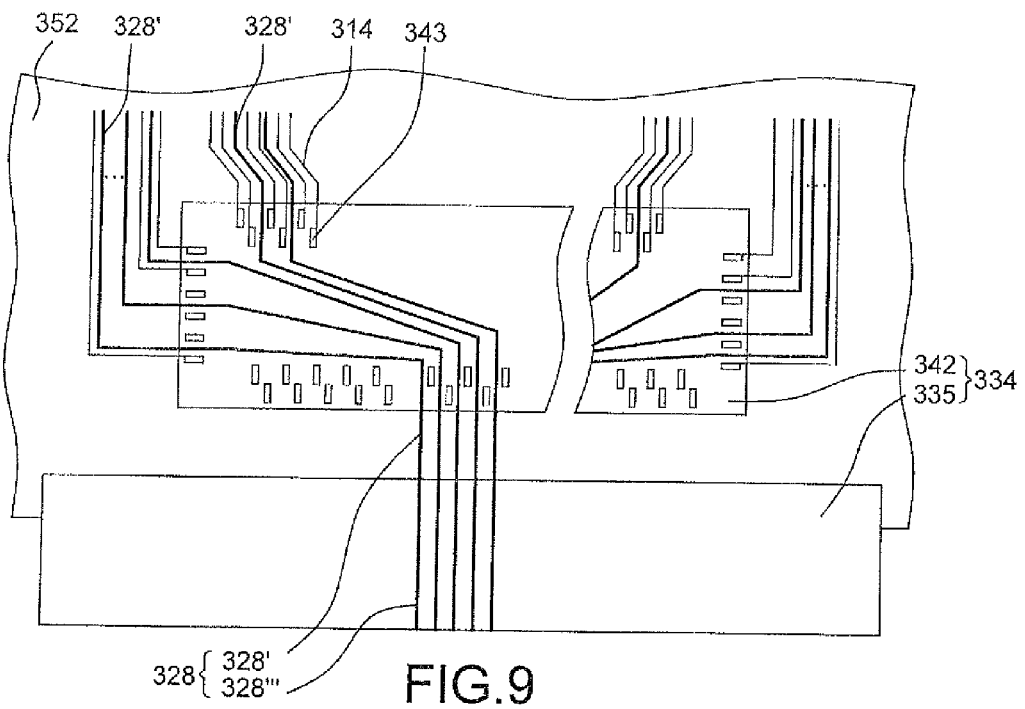
FIG. 9 is a partially expanded plan schematic view of the first connection unit according to an embodiment of the present invention, showing that the first connection unit is a Data COG Package.

Referring to FIG. 9, in this embodiment the lower substrate 352 is provided with a plurality of signal lines 328', the flexible board 335 is provided with a plurality of conductive lines 328''', and each signal line 328' and conductive line 328''' are electrically connected to each other, whereby the readout line 328 is constituted by one signal line 328' and one conductive line 328". The data driver 342 includes a plurality of bumps 343, the signal line 328' is located between the bumps 343, and the bumps 343 are electrically connected to the data lines 314. The signal lines 328' of the readout lines 328 pass through a bottom of the data driver 342 (the bottom is provided with integrated circuit, i.e. IC), but the signal lines 328' does not pass through shorting lines (not shown) located inside the data driver 342, similarly shown in FIG. 6a.

Figure 10:
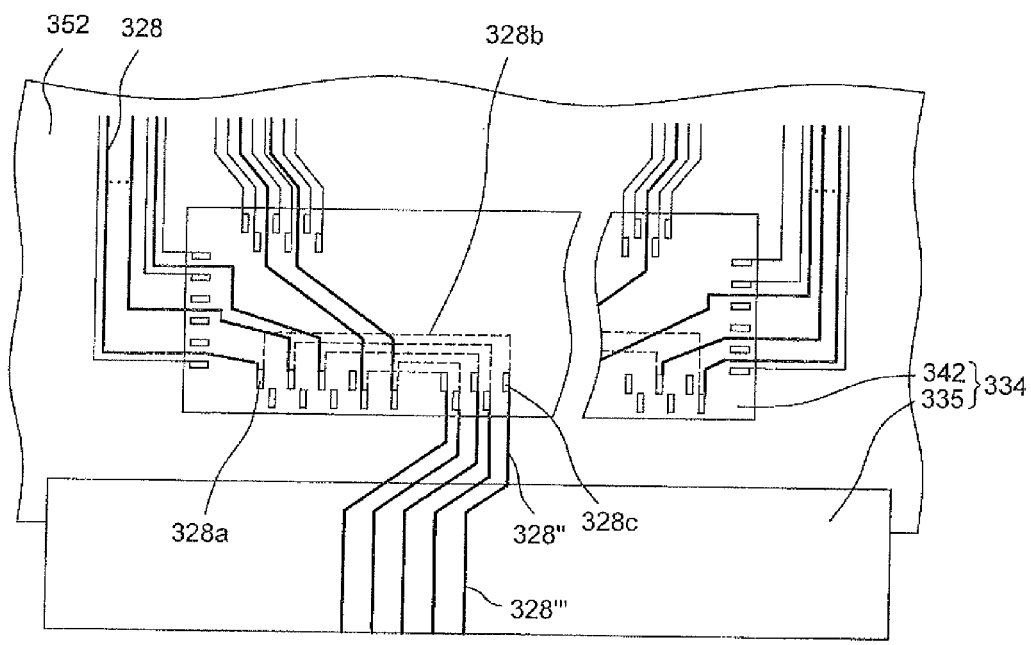
FIG. 10 is a partially expanded plan schematic view of the first connection unit according to another embodiment of the present invention, showing that the first connection unit is a Data COG Package.

Referring to FIG. 10, in another embodiment the lower substrate 352 is provided with a plurality of input signal lines 328' and output signal lines 328", the flexible board 335 is provided with a plurality of conductive lines 328''', and the data driver 342 includes a plurality of input terminals 328a, shorting lines 328b and output terminals 328c. Each input signal line 328', input terminal 328a, shorting line 328b, output terminal 328c, output signal lines 328" and conductive line 328''' are electrically connected in sequence, whereby the readout line 328 is constituted by the input signal line 328', input terminal 328a, shorting line 328b, output terminal 328c, output signal lines 328" and conductive line 328'''. As shown in FIG. 10, the readout lines 328 pass through the shorting lines 328b of the data driver 342.

The first connection unit (e.g. the combination of a data driver and a flexible board) of the present invention is designed with conductive lines corresponding to the fan-out lines and electrically connected to the signal processor. Thus, it is not necessary that the readout lines pass through an additional flexible printed circuit (FPC) board, whereby the manufacture time, the manufacture cost and the weight of liquid crystal display panel can be decreased. Furthermore, it is not necessary that the fan-out lines are extended along a periphery region of the lower substrate, and thus the fan-out lines do not occupy some area of the liquid crystal display panel so as to reduce the whole outline dimension of the liquid crystal display panel.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A liquid crystal display panel comprising:
   a lower substrate having a plurality of data lines and a periphery region;
   a printed circuit board;
   at least one connection unit adapted to connect the printed circuit board to the periphery region of the lower substrate, and comprising a driver; and
   a plurality of readout lines extended from the lower substrate to the printed circuit board through the connection unit having the driver.

2. The liquid crystal display panel as claimed in claim 1, wherein the connection unit further comprises a flexible board, and the driver is mounted on the flexible board.

3. The liquid crystal display panel as claimed in claim 2, wherein the lower substrate is provided with at least one signal line, the flexible board is provided with at least one conductive line, and the signal line and conductive line are electrically connected to each other, whereby the readout line is constituted by the signal line and conductive line.

4. The liquid crystal display panel as claimed in claim 3, wherein the readout lines pass through a bottom of the driver.

5. The liquid crystal display panel as claimed in claim 4, wherein the driver comprises a plurality of bumps, the readout lines passing through the bottom of the driver are located between the bumps, and the bumps are electrically connected to the data lines.

6. The liquid crystal display panel as claimed in claim 2, wherein:
the lower substrate is provided with at least one signal line;
the flexible board is provided with at least one input conductive line and at least one output conductive line;
the driver comprises at least one input terminal, shorting line and output terminal; and
the signal line, input conductive line, input terminal, shorting line, output terminal and output conductive line are electrically connected in sequence, whereby the readout line is constituted by the signal line, input conductive line, input terminal, shorting line, output terminal and output conductive line.

7. A liquid crystal display panel comprising:
a lower substrate having a plurality of data lines and a periphery region;
a driver mounted on the lower substrate;
a printed circuit board;
at least one connection unit adapted to connect the printed circuit board to the periphery region of the lower substrate; and
a plurality of readout lines extended from the lower substrate to the printed circuit board through the driver and the connection unit in order.

8. The liquid crystal display panel as claimed in claim 7, wherein the lower substrate is provided with at least one signal line, the connection unit further comprises a flexible board which is provided with at least one conductive line, and the signal line and conductive line are electrically connected to each other, whereby the readout line is constituted by the signal line and conductive line.

9. The liquid crystal display panel as claimed in claim 8, wherein the readout lines pass through a bottom of the driver.

10. The liquid crystal display panel as claimed in claim 9, wherein the driver comprises a plurality of bumps, the readout lines passing through the bottom of the driver are located between the bumps, and the bumps are electrically connected to the data lines.

11. The liquid crystal display panel as claimed in claim 7, wherein:
the lower substrate is provided with at least one input signal line and at least one output signal line;
the connection unit further comprises a flexible board which is provided with at least one conductive line;
the driver comprises at least one input terminal, shorting line and output terminal; and
the input signal line, input terminal, shorting line, output terminal, output signal line and conductive line are electrically connected in sequence, whereby the readout line is constituted by the input signal line, input terminal, shorting line, output terminal, output signal line and conductive line.

12. A liquid crystal display device comprising:
a top frame;
a liquid crystal display panel comprising:
a lower substrate having a plurality of data lines and a periphery region;
a printed circuit board;
at least one connection unit adapted to connect the printed circuit board to the periphery region of the lower substrate, and comprising a driver; and
a plurality of readout lines extended from the lower substrate to the printed circuit board through the connection unit having the driver; and
a backlight module including a bottom plate assembled with the top frame so as to fix the liquid crystal display panel and the backlight module on the liquid crystal display device.

13. The liquid crystal display device as claimed in claim 12, wherein the connection unit further comprises a flexible board, and the driver is mounted on the flexible board.

14. The liquid crystal display device as claimed in claim 13, wherein the lower substrate is provided with at least one signal line, the flexible board is provided with at least one conductive line, and the signal line and conductive line are electrically connected to each other, whereby the readout line is constituted by the signal line and conductive line.

15. The liquid crystal display device as claimed in claim 14, wherein the readout lines pass through a bottom of the driver.

16. The liquid crystal display device as claimed in claim 15, wherein the driver comprises a plurality of bumps, the readout lines passing through the bottom of the driver are located between the bumps, and the bumps are electrically connected to the data lines.

17. The liquid crystal display device as claimed in claim 13, wherein:
the lower substrate is provided with at least one signal line;
the flexible board is provided with at least one input conductive line and at least one output conductive line;
the driver comprises at least one input terminal, shorting line and output terminal; and
the signal line, input conductive line, input terminal, shorting line, output terminal and output conductive line are electrically connected in sequence, whereby the readout line is constituted by the signal line, input conductive line, input terminal, shorting line, output terminal and output conductive line.

18. A liquid crystal display device comprising:
a top frame;
a liquid crystal display panel comprising:
a lower substrate having a plurality of data lines and a periphery region;
a driver mounted on the lower substrate;
a printed circuit board;
at least one connection unit adapted to connect the printed circuit board to the periphery region of the lower substrate; and
a plurality of readout lines extended from the lower substrate to the printed circuit board through the driver and the connection unit in order; and
a backlight module including a bottom plate assembled with the top frame so as to fix the liquid crystal display panel and the backlight module on the liquid crystal display device.

19. The liquid crystal display device as claimed in claim 18, wherein the lower substrate is provided with at least one signal line, the connection unit further comprises a flexible board which is provided with at least one conductive line, and the signal line and conductive line are electrically connected to each other, whereby the readout line is constituted by the signal line and conductive line.

20. The liquid crystal display panel as claimed in claim 19, wherein the readout lines pass through a bottom of the driver.

21. The liquid crystal display panel as claimed in claim 20, wherein the driver comprises a plurality of bumps, the readout lines passing through the bottom of the driver are located between the bumps, and the bumps are electrically connected to the data lines.

22. The liquid crystal display panel as claimed in claim 18, wherein:
- the lower substrate is provided with at least one input signal line and at least one output signal line;
- the connection unit further comprises a flexible board which is provided with at least one conductive line;
- the driver comprises at least one input terminal, shorting line and output terminal; and
- the input signal line, input terminal, shorting line, output terminal, output signal line and conductive line are electrically connected in sequence, whereby the readout line is constituted by the input signal line, input terminal, shorting line, output terminal, output signal line and conductive line.

* * * * *